(12) United States Patent
Miyamoto et al.

(10) Patent No.: US 9,379,460 B2
(45) Date of Patent: Jun. 28, 2016

(54) TERMINAL WELDED AND CRIMPED TO A WIRE AND A SHRINKABLE TUBE COVERING THE WIRE AND THE TERMINAL

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Kenji Miyamoto, Mie (JP); Hiroki Hirai, Mie (JP); Junichi Ono, Mie (JP); Takuji Ootsuka, Mie (JP)

(73) Assignees: AUTONETWORKS TECHNOLOGIES, LTD. (JP); SUMITOMO WIRING SYSTEMS, LTD. (JP)

( * ) Notice: Subject to any disclaimer, the term of this patent is extended or adjusted under 35 U.S.C. 154(b) by 0 days.

(21) Appl. No.: 14/398,529

(22) PCT Filed: Apr. 17, 2013

(86) PCT No.: PCT/JP2013/061362
§ 371 (c)(1),
(2) Date: Nov. 3, 2014

(87) PCT Pub. No.: WO2013/175902
PCT Pub. Date: Nov. 28, 2013

(65) Prior Publication Data
US 2015/0111442 A1    Apr. 23, 2015

(30) Foreign Application Priority Data

May 23, 2012   (JP) .................................. 2012-117517

(51) Int. Cl.
*H01R 4/02* (2006.01)
*H01R 4/18* (2006.01)
(Continued)

(52) U.S. Cl.
CPC .................. *H01R 4/187* (2013.01); *H01R 4/62* (2013.01); *H01R 4/723* (2013.01); *H01R 43/005* (2013.01);
(Continued)

(58) Field of Classification Search
CPC .......... H01R 4/02; H01R 4/029; H01R 4/187; H01R 4/723; H01R 43/02
USPC ........................................................ 439/874
See application file for complete search history.

(56) References Cited

U.S. PATENT DOCUMENTS

| 3,955,044 A | * | 5/1976 | Hoffman | .................. | H01R 4/62 |
| | | | | | 174/84 C |
| 7,896,712 B2 | * | 3/2011 | Cecil | ........................ | H01R 4/20 |
| | | | | | 439/523 |

(Continued)

FOREIGN PATENT DOCUMENTS

| JP | 11-329658 | 11/1999 |
| JP | 2007-012329 | 1/2007 |

(Continued)

OTHER PUBLICATIONS

International Search Report of Jul. 2, 2013.

*Primary Examiner* — Chandrika Prasad
(74) *Attorney, Agent, or Firm* — Gerald E. Hespos; Michael J. Porco; Matthew T. Hespos

(57) ABSTRACT

A terminal-provided wire (10) includes a wire (11) formed by covering a core (12) with an insulation coating (13), a terminal (20) to be connected to the core (12) exposed at an end of the wire (10), and a shrinkable tube (28) for sealing a wire connecting portion (25) formed by connecting the exposed core (11) and the terminal (20). An inclined surface (12A) for making a thickness of the core (12) smaller toward the tip of the core (12) is formed by welding on a part of the exposed core (12) before the wire connecting portion (25).

8 Claims, 4 Drawing Sheets

(51) Int. Cl.
*H01R 4/62* (2006.01)
*H02G 1/14* (2006.01)
*H02G 15/04* (2006.01)
*H01R 4/72* (2006.01)
*H01R 43/00* (2006.01)
*H01R 43/02* (2006.01)
*H01R 43/28* (2006.01)

(52) U.S. Cl.
CPC ............ *H01R 43/0249* (2013.01); *H01R 43/28* (2013.01); *H02G 1/14* (2013.01); *H02G 15/046* (2013.01); *Y10T 29/49179* (2015.01); *Y10T 29/53213* (2015.01)

(56) References Cited

U.S. PATENT DOCUMENTS

2011/0048762 A1* 3/2011 Sawamura .......... B60R 16/0207
  174/78
2011/0177727 A1* 7/2011 Zhao ...................... H01R 4/023
  439/874

FOREIGN PATENT DOCUMENTS

| JP | 2009-230998 | 10/2009 |
| JP | 2012-054143 | 3/2012 |
| JP | 2012-079654 | 4/2012 |

* cited by examiner

TERMINAL WELDED AND CRIMPED TO A WIRE AND A SHRINKABLE TUBE COVERING THE WIRE AND THE TERMINAL

BACKGROUND

1. Field of the Invention

The present invention relates to a terminal-provided wire, a method for manufacturing the same and a jig.

2. Description of the Related Art

Japanese Unexamined Patent Publication No. 2009-230998 discloses a terminal-provided wire including a wire and a terminal to be crimped to a wire end. The terminal-provided wire of Japanese Unexamined Patent Publication No. 2009-230998 is used, for example, in an engine compartment of an automotive vehicle. Since water can normally enter the engine compartment, water may adhere to a connecting part of the terminal and the wire. If water adheres to this connecting part, the terminal and a core made of metal materials are corroded.

Particularly, if members made of mutually different metals are connected such as when the terminal is made of copper and the core is made of aluminum, corrosion easily occurs. Thus, in the terminal-provided wire described in Japanese Unexamined Patent Publication No. 2009-230998, the connecting part is covered with a shrinkable tube. By fitting the shrinkable tube, water does not enter the connected part of the terminal-provided wire from the surrounding.

In the case of covering the terminal-provided wire with the shrinkable tube, it is necessary not to form any clearance between the shrinkable tube and terminal surfaces to enhance waterproofness. However, at a tip part of the core, there is a large level difference corresponding to a thickness of the core from the terminal surface (surface on which the core is placed). Thus, a space is formed between the shrinkable tube and the tip surface of the core. Thus, the shrinkable tube needs to be mounted in an area long in an axial direction of the wire (core), wherefore it has been difficult to reduce the size of a waterproof structure.

The present invention was completed based on the above situation and aims to provide a terminal-provided wire having a waterproof structure reduced in size.

SUMMARY OF THE INVENTION

To solve the above problem, the present invention is directed to a terminal-provided wire, including a wire formed by covering a core with an insulation coating; a terminal to be connected to the core exposed at an end of the wire; and a shrinkable tube for sealing a wire connecting portion formed by connecting the exposed core and the terminal, wherein an inclined surface for making a thickness of the core smaller toward the tip of the core is formed by welding on a part of the exposed core before the wire connecting portion.

The present invention is also directed to a method for manufacturing a terminal-provided wire including a wire formed by covering a core with an insulation coating, a terminal to be connected to the core exposed at an end of the wire and a shrinkable tube for sealing a wire connecting portion formed by connecting the exposed core and the terminal, wherein an inclined surface for making a thickness of the core smaller toward the tip of the core is formed by placing the exposed core on the terminal and welding the tip of the exposed core.

The present invention is further directed to a jig used in a method for manufacturing a terminal-provided wire including a wire formed by covering a core with an insulation coating, a terminal to be connected to the core exposed at an end of the wire and a shrinkable tube for sealing a wire connecting portion formed by connecting the exposed core and the terminal, wherein an inclined surface for making a thickness of the core smaller toward the tip of the core on a part of the exposed core before the wire connecting portion is formed by welding.

In the present invention, since the inclined surface for making the thickness of the core smaller toward the tip of the core is formed on the tip of the core exposed at the end of the wire, a level difference at the tip of the exposed core can be made smaller. Thus, according to the present invention, the shrinkable tube has only to be mounted along the inclined surface of the exposed core and an unnecessary space is unlikely to be formed. Therefore, a mounting length of the shrinkable tube can be shortened, with the result that a waterproof structure can be reduced in size.

The inclined surface can be formed, for example, by a method for cutting the core. If the inclined surface is formed by cutting, it is also conceivable that an operator is injured by the cut core or the core is loosened on the cut surface to widen the inclined surface. However, since the inclined surface is formed by welding in the present invention, such problems do not occur.

The present invention is preferably configured as follows.

If the wire connecting portion is formed by welding in the terminal-provided wire, it is not necessary to form the terminal with a crimping piece to be crimped to the core. Thus, the waterproof structure can be reliably reduced in size.

If the wire connecting portion is formed together with the inclined surface by welding in an inclined surface forming step of forming the inclined surface in the method for manufacturing the terminal-provided wire, the inclined surface and the wire connecting portion can be formed in one step.

If the jig includes an inclined surface forming portion for forming the inclined surface and a connecting portion forming portion for forming the wire connecting portion, the inclined surface and the wire connecting portion can be formed by one jig and manufacturing cost can be reduced.

According the present invention, it is possible to provide a terminal-provided wire having a waterproof structure reduced in size.

DETAILED DESCRIPTION

One embodiment of the present invention is described with reference to FIGS. 1 to 4.

Figure 1:
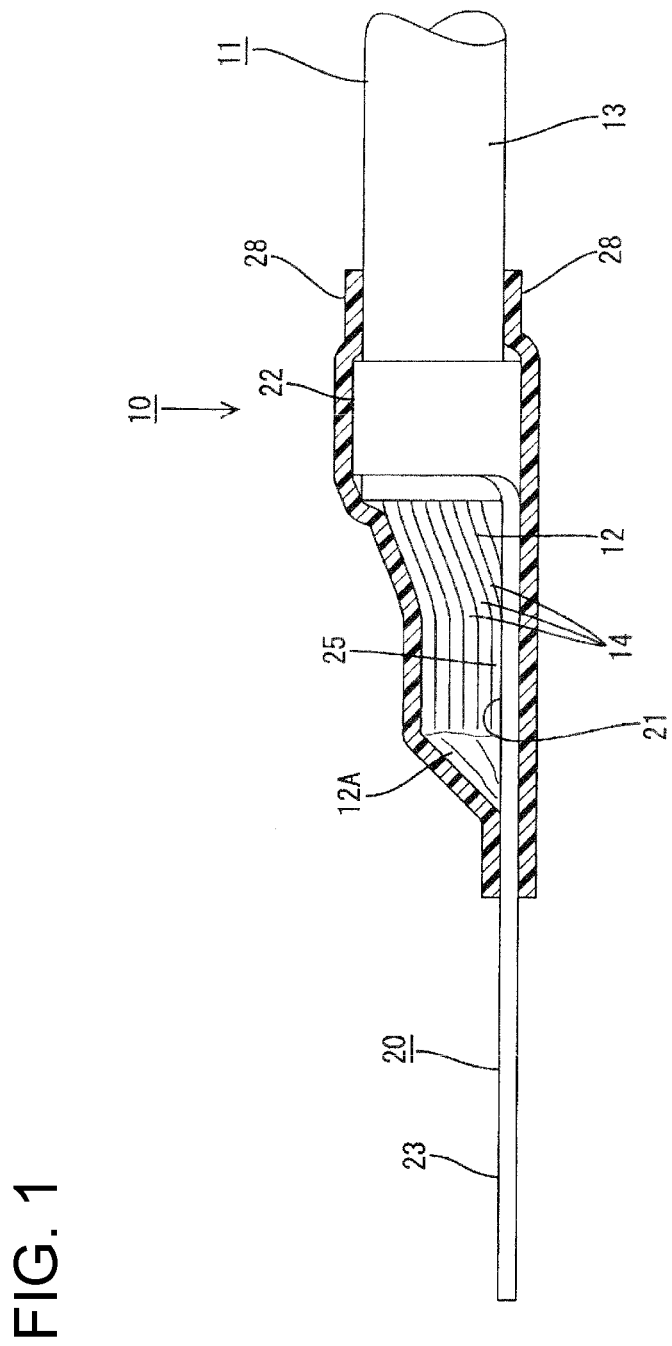
FIG. 1 is a section of a terminal-provided wire according to one embodiment.

As shown in FIG. 1, a terminal-provided wire 10 includes a wire 11, a terminal 20 to be connected to an end of this wire 11 and a heat shrinkable tube 28 (an example of a shrinkable tube 28) fitted (sealed) to surround a wire connecting portion 25 where the wire 11 and the terminal 20 are connected. In the following description, a vertical direction is based on FIG. 1 and left and right sides of FIG. 1 are referred to as front and rear sides.

(Wire 11)

As shown in FIG. 1, the wire 11 includes a core 12 formed by twisting a plurality of metal strands 14 and an insulation coating 13 (insulation layer) made of synthetic resin for covering the outer periphery of the core 12. For example, copper, copper alloy, aluminum, aluminum alloy and the like can be used as a material of the core 12 and an arbitrary metal material is appropriately selected according to need. The insulation coating 13 is removed at an end part of the wire 11 to expose the core 12 (this part is also referred to as an exposed core 12). Note that a single core may be used as the core 12 instead of the one made of the plurality of metal strands 14.

As shown in FIG. 1, an inclined surface 12A for making a thickness of the core 12 smaller toward the tip of the core 12 is formed by welding on a part of the core 12 exposed at the end of the wire 11 and located before the wire connecting portion 25.

(Terminal 20)

The shape of the terminal 20 is a generally used shape and the terminal 20 is formed by press-working a metal plate material into a predetermined shape. Copper, copper alloy, aluminum, aluminum alloy, iron, iron alloy and the like can be used as the metal plate material and arbitrary metal can be used according to need. In this embodiment, copper or copper alloy is used. Further, the metal plate material may be plated with arbitrary metal such as tin or nickel. In this embodiment, a tin plating layer is formed on a surface of the metal material (copper or copper alloy) forming the terminal 20.

Figure 2:
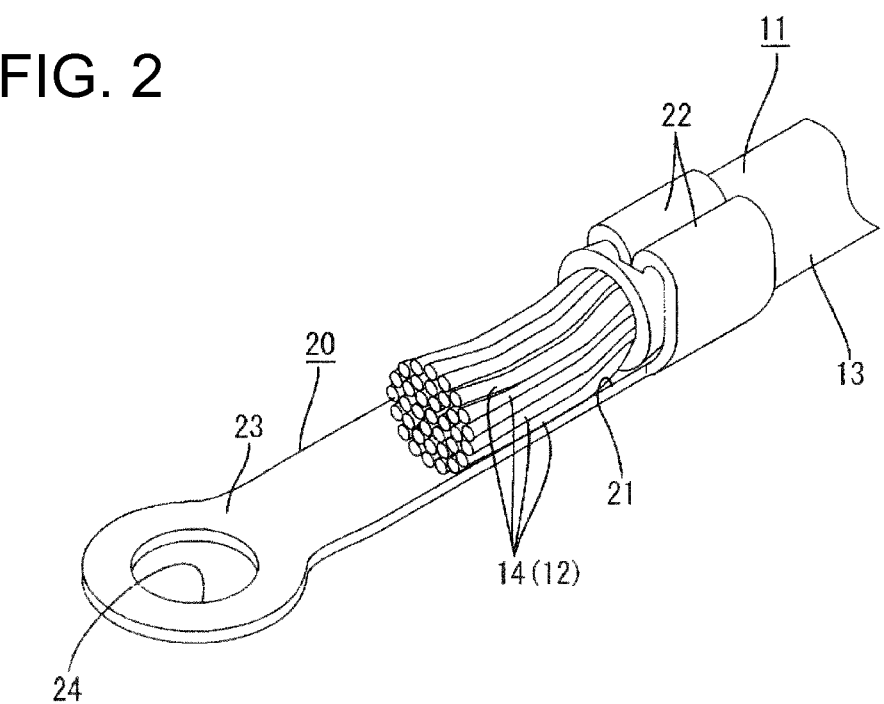
FIG. 2 is a perspective view of a terminal, on which a wire is placed, before an inclined surface is formed.

As shown in FIGS. 1 and 2, the terminal 20 includes a bottom plate 21 on which the exposed core 12 exposed at the end side of the wire 11 is placed to be electrically connected and a pair of barrels 22 having a substantially rectangular shape and extending upward from opposite side parts of the bottom plate 21 and to be crimped to wind around the outer periphery of the insulation coating 13. Further, the terminal 20 includes a terminal connecting portion 23 extending in an axial direction (length direction) of the wire 11 toward a side opposite to the barrels 22 (left side) in the length direction and to be connected to an unillustrated mating terminal.

The bottom plate 21 of the terminal 20 and the exposed core 12 are connected by welding (an example of the wire connecting portion 25). The terminal connecting portion 23 is plate-like and an insertion hole 24, through which an unillustrated bolt is insertable, is formed to penetrate through the terminal connecting portion 23 in a plate thickness direction.

(Heat Shrinkable Tube 28)

The heat shrinkable tube 28 is a tubular member which is made of a synthetic resin material and shrinks upon being heated. In this embodiment, the heat shrinkable tube 28 is fitted from a position before the end of the wire 11 to a position behind a part of the insulation coating 13, to which the barrels 22 are crimped, via the wire connecting portion 25 of the end of the wire 11 and the terminal 20 as shown in FIG. 1.

A front side of the heat shrinkable tube 28 is fitted in close contact with the surfaces (upper and lower surfaces) of the terminal 20 and the outer peripheral surface of the exposed core 12 and a rear side is fitted in close contact with the insulation coating 13 of the wire 11 while surrounding the insulation coating 13.

An adhesive layer (not shown) which exhibits adhesiveness upon being heated to be softened or melted is formed on the inner peripheral surface of the heat shrinkable tube 28. A known adhesive used in wires 11 of this type can be applied as an adhesive used for the adhesive layer. Note that it is also possible to provide no adhesive layer on the inner peripheral surface of the heat shrinkable tube 28.

(Method for Manufacturing Terminal-Provided Wire 10 and Jig 30)

Next, a method for manufacturing the terminal-provided wire 10 according to this embodiment is described.

By applying a punching process to punch a flat metal plate material into a development shape by a press machine, the terminal to be mounted on the wire 11 is produced.

Figure 3:
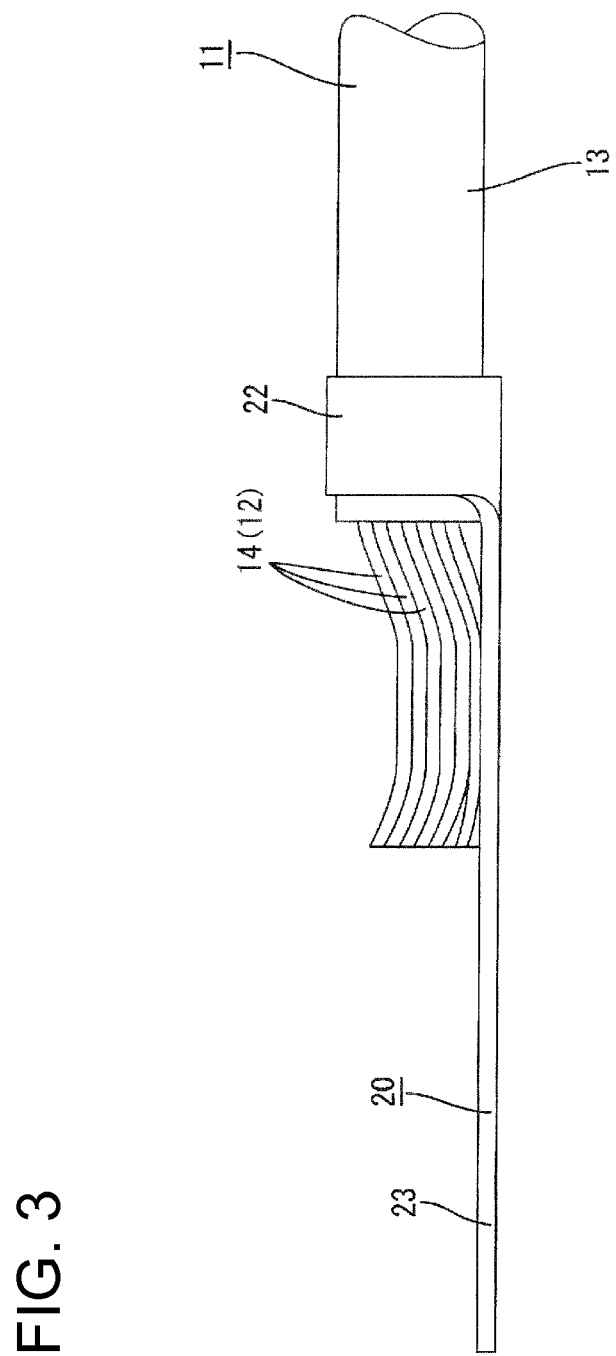
FIG. 3 is a side view of the terminal, on which the wire is placed, before the inclined surface is formed.

The wire 11 in which the core 12 is exposed by peeling and removing the insulation coating 13 at the end is placed on the bottom plate 21 and the pair of barrels 22 are crimped to the insulation coating 13 using an unillustrated crimping apparatus, thereby producing the wire 11 mounted with the terminal 20 as shown in FIGS. 2 and 3.

Figure 4:
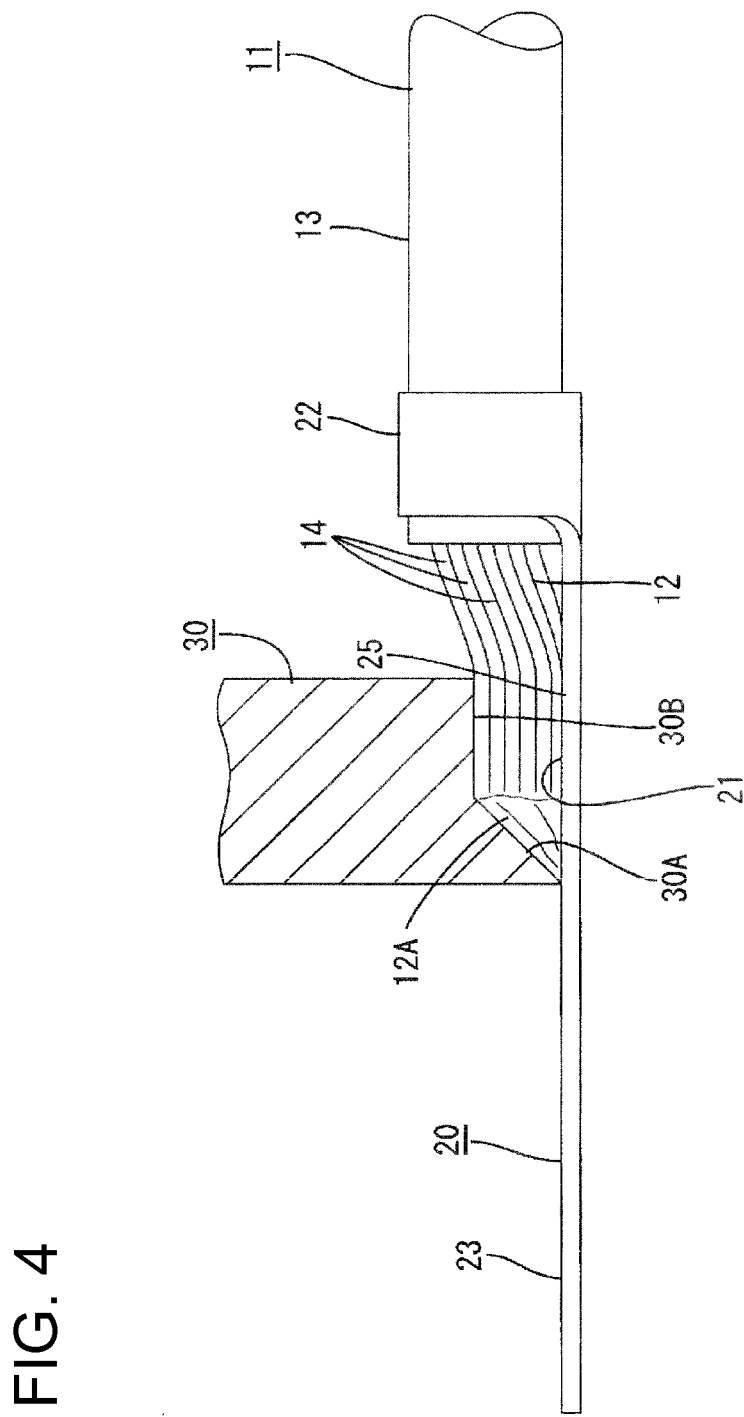
FIG. 4 is a partial section showing a state where a core is welded to the terminal.

Next, welding is performed using the jig 30 as shown in FIG. 4. Welding methods such as resistance welding and ultrasonic welding can be used as a welding method.

The jig 30 used in welding includes an inclined surface part 30A and a flat surface part 30B continuous with the inclined surface part 30A as shown in FIG. 4. The inclined surface part 30A of the jig 30 is a part for forming the inclined surface 12A on the tip of the core 12 (an example of an inclined surface forming portion) and the flat surface part 30B is a part for forming the connecting portion (wire connecting portion 25) of the core 12 and the terminal 20 (an example of a connecting portion forming portion).

When welding is performed using the jig 30 shown in FIG. 4, the inclined surface 12A can be formed on the tip of the core 12 exposed at the end of the wire 11 and the wire connecting portion 25 can be formed by connecting the core 12 and the terminal 20 in one step. That is, the wire connecting portion 25 can be formed in an inclined surface forming step.

After the core 12 and the terminal 20 are connected by welding, the tubular heat shrinkable tube 28 in an unheated state (not shown) is fitted to the end part of the wire 11 mounted with the terminal 20. The heat shrinkable tube 28 may be fitted from the side of the terminal 20 or from the side of the wire 11.

A heating process is applied to the terminal 20 on the end part of the wire 11 fitted with the heat shrinkable tube 28 in an unillustrated heating apparatus. In this heating step, the heat shrinkable tube 28 thermally shrinks.

Due to thermal shrinkage, the heat shrinkable tube 28 is fitted from the position before the end of the wire 11 to the position behind the insulation coating 13, to which the barrels 22 are crimped, via the wire connecting portion 25 of the end of the wire 11 and the terminal 20 as shown in FIG. 1. At this time, the front side (left side) of the heat shrinkable tube 28 is held in close contact with the surfaces of the terminal 20 and the outer peripheral surface of the core 12 almost without any clearance, and the rear side (other side) is held in close contact with the insulation coating 13 of the wire 11 without any clearance. In this way, the terminal-provided wire 10 of this embodiment is obtained.

(Functions and Effects of Embodiment)

Since the inclined surface 12A for making the thickness of the core 12 smaller toward the tip of the core 12 is formed on the tip of the core 12 exposed at the end of the wire 11 in this embodiment, a level difference at the tip of the exposed core 12 can be made smaller.

Thus, according to this embodiment, the heat shrinkable tube 28 can be mounted along the inclined surface 12A of the exposed core 12 and an unnecessary space is unlikely to be formed. Therefore, a mounting length of the heat shrinkable tube 28 can be shortened, with the result that a waterproof structure can be reduced in size.

Further, since the inclined surface 12A is formed by welding according to this embodiment, there are no such problems that an operator is injured by the cut core 12 such as when the inclined surface 12A is formed by cutting the core 12 and the core 12 is loosened on the cut surface to widen the inclined surface 12A.

Further, since the wire connecting portion 25 is formed by welding according to this embodiment, it is not necessary to provide the terminal 20 with a crimping piece to be crimped to the core 12. Therefore, the waterproof structure can be reliably reduced in size.

Further, since the wire connecting portion 25 is formed together with the inclined surface 12A by welding in the inclined surface forming step of forming the inclined surface 12A according to the manufacturing method of this embodiment, the inclined surface 12A and the wire connecting portion 25 can be formed in one step.

Furthermore, since the jig 30 used in this embodiment includes the inclined surface forming portion 30A and the connecting portion forming portion 30B, the inclined surface 12A and the wire connecting portion 25 can be formed by one jig 30 and manufacturing cost can be reduced.

The present invention is not limited to the above described and illustrated embodiment. For example, the following embodiments are also included in the technical scope of the present invention.

Although the heat shrinkable tube 28 is used as the shrinkable tube 28 in the above embodiment, there is no limitation to this. A shrinkable tube other than the one that thermally shrinks may also be used.

Although the terminal 20 including only the barrels 22 to be crimped to the insulation coating 13 is illustrated in the above embodiment, the terminal 20 may include barrels 22 to be crimped to the core 12.

Although the jig 30 capable of forming the inclined surface 12A and the wire connecting portion 25 in one step is illustrated in the above embodiment, the inclined surface and the wire connecting portion may be formed by separate jigs.

LIST OF REFERENCE SIGNS

10 . . . terminal-provided wire
11 . . . wire
12 . . . core (exposed core)
12A . . . inclined surface
13 . . . insulation coating
14 . . . strand
20 . . . terminal
25 . . . wire connecting portion
28 . . . heat shrinkable tube (shrinkable tube)
30 . . . jig
30A . . . inclined surface part (inclined surface forming portion)
30B . . . flat surface part (connecting portion forming portion)

The invention claimed is:

1. A terminal-provided wire, comprising:
a terminal having a base extending in forward and backward directions and a wire connecting portion;
a wire having an end, a core extending from the end and an insulation coating covering the core from a location spaced from the end so that a section of the core from the end to the insulation coating defines an exposed core portion, an area of the insulation coating in proximity to the exposed core portion being crimped by the wire connecting portion to define a crimped connection between the terminal and the wire, the exposed core being welded to the base of the terminal to define a weld having an inclined surface extending from the end of the core to a position on the base of the terminal spaced from the wire;
and
a shrinkable tube fitted about the terminal and the wire, the shrinkable tube covering at least the inclined surface of the weld, the exposed core, and a portion of the insulation coating.

2. A terminal-provided wire according to claim 1, wherein the wire connecting portion is formed by welding.

3. The terminal-provided wire of claim 1, wherein the inclined surface is formed by welding.

4. The terminal-provided wire of claim 1, wherein the terminal comprises first and second crimping portions rearward of the wire connecting portion crimped to the insulation coating of the wire.

5. The terminal-provided wire of claim 4, wherein the shrinkable tube extends from a position forward of the inclined surface to a position rearward of the first and second crimping portions.

6. The terminal-provided wire of claim 1, wherein the core comprises a plurality of metal strands.

7. The terminal-provided wire of claim 1, wherein the shrinkable tube is heat-shrunk to the terminal and the wire.

8. The terminal-provided wire of claim 1, wherein the inclined surface of the core is forward of the wire connecting portion of the terminal.

* * * * *